US012325191B2

(12) United States Patent
Storck et al.

(10) Patent No.: US 12,325,191 B2
(45) Date of Patent: Jun. 10, 2025

(54) ADDITIVE MANUFACTURING WITH IN SITU DEFECT DETECTION

(71) Applicant: The Johns Hopkins University, Baltimore, MD (US)

(72) Inventors: Steven M. Storck, Catonsville, MD (US); Nathan G. Drenkow, Columbia, MD (US); Brendan P. Croom, Baltimore, MD (US); Ryan H. Carter, Ellicott City, MD (US); Robert K. Mueller, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 385 days.

(21) Appl. No.: 17/676,407

(22) Filed: Feb. 21, 2022

(65) Prior Publication Data

US 2022/0266531 A1 Aug. 25, 2022

Related U.S. Application Data

(60) Provisional application No. 63/151,656, filed on Feb. 20, 2021.

(51) Int. Cl.
*B33Y 50/02* (2015.01)
*B29C 64/153* (2017.01)
(Continued)

(52) U.S. Cl.
CPC .......... *B29C 64/393* (2017.08); *B29C 64/153* (2017.08); *B33Y 10/00* (2014.12);
(Continued)

(58) Field of Classification Search
CPC ................ B29C 64/393; B29C 64/153; B29C 2791/009; B33Y 10/00; B33Y 50/02;
(Continued)

(56) References Cited

U.S. PATENT DOCUMENTS

2014/0277662 A1* 9/2014 Kesler .................... G06Q 10/06
700/97
2015/0024233 A1* 1/2015 Gunther .................. B22F 10/40
264/401

(Continued)

OTHER PUBLICATIONS

Luke Scime et al., "A multi-scale convolutional neural network for autonomous anomaly detection and classification in a laser powder bed fusion additive manufacturing process," Additive Manufacturing 24, 2018, pp. 273-286.

(Continued)

*Primary Examiner* — Christopher E. Everett
(74) *Attorney, Agent, or Firm* — Noah J. Hayward (57) ABSTRACT

A method for monitoring and analyzing an additive manufacturing process includes heating a melt zone to fuse an additive media with an active layer to build a part being manufactured based on a part design model, capturing raw melt data of the melt zone, and generating an active layer dataset that is spatially defined. The method may also include analyzing the active layer dataset with respect to a plurality of defect signatures within a defect signature library. The defect signature library may be predefined based on a machine learning processing of historical sensor datasets with corresponding ground truth datasets. The method may also include detecting a defect in the part based on the analysis of the active layer dataset with respect to a plurality of defect signatures, simultaneously with the energy source acting upon the active layer of the part for manufacturing of the part.

20 Claims, 6 Drawing Sheets

(51) Int. Cl.
  *B29C 64/393*  (2017.01)
  *B33Y 10/00*   (2015.01)
  *G06T 7/00*    (2017.01)
  *G06V 10/70*   (2022.01)

(52) U.S. Cl.
  CPC ............ *B33Y 50/02* (2014.12); *G06T 7/0004* (2013.01); *G06V 10/70* (2022.01); *B29C 2791/009* (2013.01); *G06T 2207/10048* (2013.01); *G06T 2207/20081* (2013.01); *G06T 2207/30144* (2013.01)

(58) Field of Classification Search
  CPC ......... G06T 7/0004; G06T 2207/10048; G06T 2207/20081; G06T 2207/30144; G06T 2207/30136; G06V 10/70; B22F 10/20; B22F 10/28; B22F 10/85; B22F 12/90; G06N 20/00
  See application file for complete search history.

(56) References Cited

U.S. PATENT DOCUMENTS

| | | | |
|---|---|---|---|
| 2016/0052086 A1* | 2/2016 | Mazumder | B29C 64/393 219/76.1 |
| 2016/0184893 A1* | 6/2016 | Dave | B33Y 50/02 419/53 |
| 2017/0246809 A1* | 8/2017 | Starr | B29C 64/393 |
| 2017/0266762 A1* | 9/2017 | Dave | B22F 10/366 |
| 2018/0012311 A1* | 1/2018 | Small | B22F 10/39 |
| 2018/0050423 A1* | 2/2018 | Hoferer | B33Y 50/02 |
| 2019/0283333 A1* | 9/2019 | Hwang | G06N 3/045 |
| 2021/0402481 A1* | 12/2021 | Stecker | B29C 64/171 |
| 2022/0088685 A1* | 3/2022 | Kenworthy | B22F 10/28 |

OTHER PUBLICATIONS

Masoud Harooni et al., "Laser Welding of Magnesium Alloys: Issues and Remedies," Chapter 1, 2017, pp. 1-35.

Luca Mazzoleni et al., "Real-Time Observation of Melt Pool in Selective Laser Melting: Spatial, Temporal, and Wavelength Resolution Criteria," IEEE Transactions on Instrumentation and Measurement, vol. 69, No. 4, Apr. 2020, pp. 1179-1190.

Jitka Metelkova et al., "On the influence of laser defocusing in Selective Laser Melting of 316L," Additive Manufacturing 23, 2018, pp. 161-169.

* cited by examiner

ADDITIVE MANUFACTURING WITH IN SITU DEFECT DETECTION

CROSS-REFERENCE TO RELATED APPLICATIONS

This application claims priority to and the benefit of prior-filed, U.S. Provisional Application No. 63/151,656 filed on Feb. 20, 2021, the entire content of which is hereby incorporated herein by reference.

TECHNICAL FIELD

Example embodiments generally relate to additive manufacturing and, in particular, to monitoring and response systems employed in conjunction with additive manufacturing.

BACKGROUND

Additive manufacturing, which can be considered a type of three-dimensional (3D) printing, is useful in a wide variety of applications for constructing new and replacement parts. In many instances, additive manufacturing techniques are superior to many conventional manufacturing techniques due to the ability to construct shapes of parts that could not be constructed using conventional techniques. Additive manufacturing is often used in the construction of component parts for large complex devices, such as vehicles. For example, in the aviation industry, additive manufacturing techniques have proven to be very useful for manufacturing parts. Because high stresses and strains may be placed on aviation components, parts must be certified for use in the construction of the aircraft, and therefore it is often important to minimize defects is a part that can be formed when using additive manufacturing techniques.

Defects occurring the manufacturing of a part can occur for a number of reasons. For example, melt temperatures that are too high or too low can lead to defects. While a singular defect is often of little concern, a collection of defects or defects located at certain locations can increase the likelihood that a part may fail when in use. As a result, parts must often be subjected to post-production scanning using, for example, x-ray technologies. These scanning processes capture internal images of the part that are reviewed to identify defects that may be problematic and require the part to be scrapped, often after many hours of manufacturing and inspection time. The inspection process alone can be quite time consuming, often accounting for fifty to sixty percent of the total cost of the production of the part. As such, it would be beneficial to limit or avoid the additional time and cost associated with post-production scanning and defect detection.

BRIEF SUMMARY

According to some example embodiments, a method for monitoring and analyzing an additive manufacturing process is provided. The method may include heating, via an energy source, a melt zone to fuse an additive media with an active layer to build a part being manufactured based on a part design model. The example method may also include capturing, by a sensor, raw melt data of the melt zone, and generating, based on the raw melt data, an active layer dataset that is spatially defined. Additionally, the example method may also include analyzing the active layer dataset with respect to a plurality of defect signatures within a defect signature library. In this regard, the defect signature library may be predefined based on a machine learning processing of historical sensor datasets with corresponding ground truth datasets. Further, according to some example embodiments, the example method may include detecting a defect in the part based on the analysis of the active layer dataset with respect to a plurality of defect signatures, simultaneously with the energy source acting upon the active layer of the part for manufacturing of the part.

According to some example embodiments, a system for monitoring and analyzing an additive manufacturing process is provided. The example system may include a laser energy source configured to heat a melt zone to fuse an additive media with an active layer to build a part being manufactured based on a part design model, a sensor configured to capture raw melt data of the melt zone, and processing circuitry. The processing circuitry may be configured to generate, based on the raw melt data, an active layer dataset that is spatially defined. The processing circuitry may analyze the active layer dataset with respect to a plurality of defect signatures within a defect signature library. The defect signature library may be predefined based on a machine learning processing of historical sensor datasets with corresponding ground truth datasets. Additionally, the processing circuitry may be configured to detect a defect in the part based on the analysis of the active layer dataset with respect to a plurality of defect signatures, simultaneously with the laser energy source acting upon the active layer of the part for manufacturing of the part.

According to some example embodiments, an apparatus for monitoring and analyzing an additive manufacturing process is provided. The apparatus may include processing circuitry configured to generate, based on raw melt data provided by a sensor, an active layer dataset that is spatially defined, and analyze the active layer dataset with respect to a plurality of defect signatures within a defect signature library. The defect signature library may be predefined based on a machine learning processing of historical sensor datasets with corresponding ground truth datasets. The processing circuitry may also be configured to detect a defect in a part being manufactured based on the analysis of the active layer dataset with respect to a plurality of defect signatures, simultaneously with a laser energy source acting upon an active layer of the part for manufacturing the part.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to various example embodiments, systems, apparatuses, and methods are described herein that enable in situ detection of defects during the additive manufacturing process. To do so, imaging data may be captured by one or more sensors (e.g., photodiodes, cameras, or the like) directed at a melt zone generated by a laser or other energy source. The sensor may capture, for example, light intensity data, spectral data, or the like at the melt zone, which may be converted, for example, into thermal data indicative of the temperature at the melt zone coupled with spatial or position data for where that temperature was measured. The thermal information may be compared to predefined or trained defect signatures to determine whether a defect has occurred during the manufacturing process. The defect signatures may be trained via machine learning.

Because defects may be detected during manufacturing, the manufacturing process can be immediately stopped upon detection of a problematic defect, and the partially completed part may be scrapped, rather than spending the unnecessary time completing a defective part. Alternatively, manufacture-time remedial measures may be taken to, for example, heal a detected defect during the manufacturing process. Also, because defect detection is performed during manufacturing, post-production scanning can be eliminated from the part production process, and parts can be certified as soon as manufacturing is complete. Such an approach therefore leads to substantial reductions in the time and cost of part production using additive manufacturing processes.

As such, tomography may be performed based on, for example, thermal data and other data as the part is being manufactured and the defects can be identified within the tomography. In some instances, remedial measures need not be taken to eliminate the defect, but the location of the defect may be logged within a three-dimensional defect model that is continually generated as the part is being manufactured. As such, when the manufacturing process is complete, an entire model of the part, with identified defects, is also generated and may be, when necessary, immediately considered in a post-production analysis for part certification. Even when such post-production analysis takes place, the cost and time associated with x-ray scanning the part may be avoided. Such an approach may be particularly useful in additive manufacturing where the material being used for the manufacturing cannot be penetrated by x-ray imaging or x-ray imaging can only penetrate with a high enough energy to resolve large defects (e.g., 1 millimeter dimension defects when sub 0.1 millimeter dimension defect detection is needed), but certification of the part must still be performed.

According to some example embodiments, the in situ tomography and defect detection as described herein may be implemented, for example, in the context of additive manufacturing techniques such as powder bed fusion techniques using a laser, electron-beam, or the like. More specifically, according to some example embodiments, additive manufacturing techniques such as directed energy disposition or selective laser melting (SLM). SLM is a type of metal additive manufacturing technique that uses a laser or other energy source to melt or fuse a metal powder onto a substrate to build a metal part in a layered process. In this regard, according to some example embodiments, a 3D model of a part may be designed and stored as a design model. The 3D design model may then be decomposed into a number of two-dimensional (2D) layers. The 2D layers actually have a thickness of, for example, 20 to 100 micrometers. The SLM system may construct the part by forming each of the 2D layers in a process where the each layer is constructed on a next layer, one layer at a time.

Figure 1:
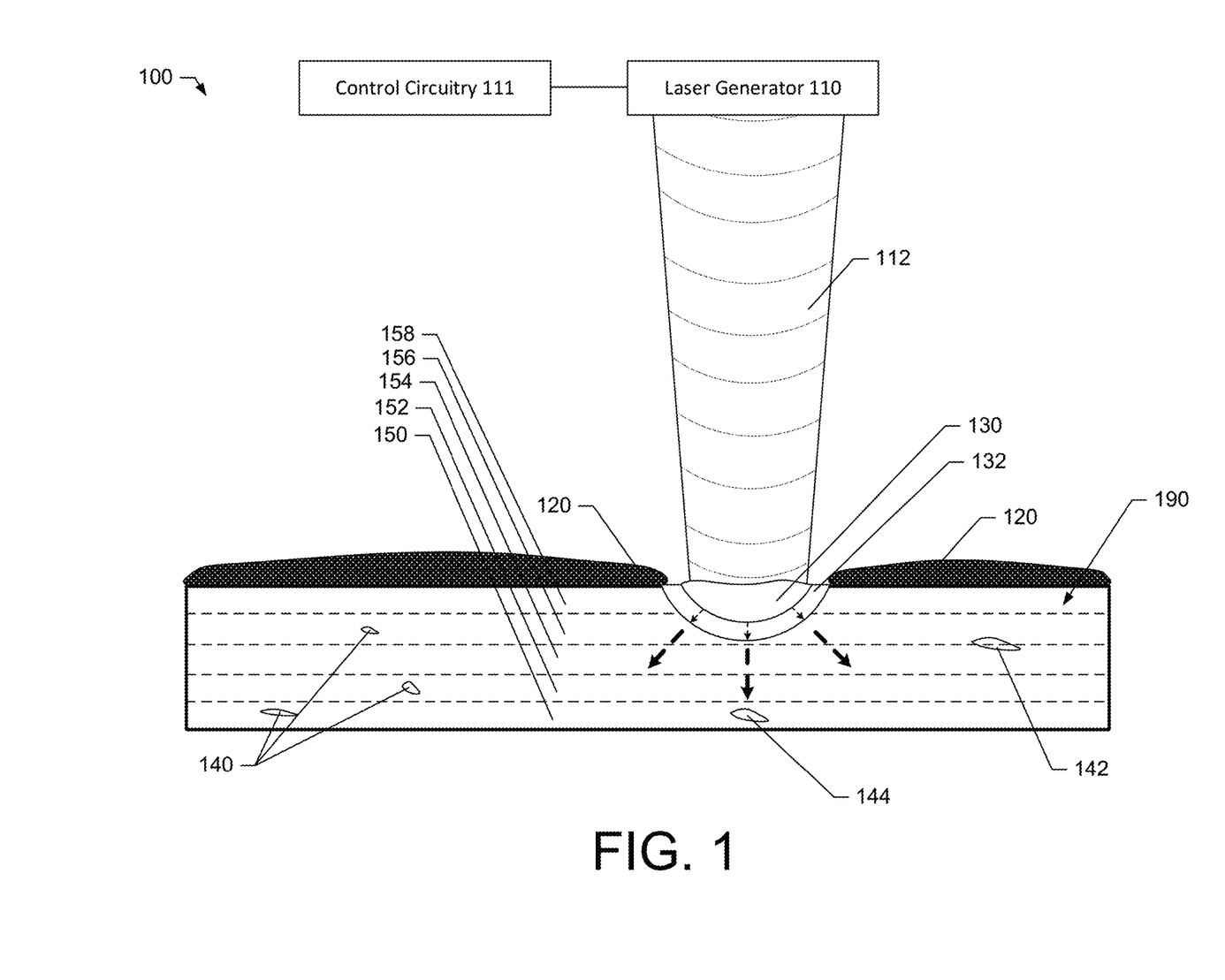
FIG. 1 illustrates an example additive manufacturing system constructing a part according to some example embodiments.

Referring now to FIG. 1, an example system 100 for performing additive manufacturing using as laser 112, such as an SLM system, is shown. A laser generator 110 may be generate the laser 112 under the control of the control circuitry 111. The laser generator 110 may be a high-powered (e.g., 200 watt or more) laser generator that is configured to move or scan across the surface of a part 190 to control the melting of a powder 120 (e.g., a metal powder) to build the part 190. The control circuitry 111 may be configured to control the laser generator 110 based on a 3D design model of the part 190 or 2D layers of the 3D part model to construct the part 190. According to some example embodiments, the laser generator 110 may be a generator of another type of energy source device such as an electron beam generator, a microwave beam generator, or the like.

As shown in FIG. 1, the laser 112 has already formed layers 150, 152, 154, and 156 of the part 190, and the laser 112 is currently melting the powder 120 to form layer 158. As such, layer 158 may be referred to as the processing or active layer, while the previous layers may be previously constructed, sintered layers. The laser 112 may melt the powder 120 in a melt zone into a melt pool 130 of molten material to form the layer 158. However, the melt pool 130 may extend into lower layers as shown in FIG. 1, where the melt pool extends into layer 156 to re-melt portions of the layer 156. As such, due to heat conduction from the laser 112 and the melt pool 130, a re-melt region 132 may form with the heat conduction in the re-melt region being indicated by the arrows. Heat may also be conducted into the areas surrounding the re-melt region 132. While these areas may not become molten, the conduction of heat may still affect the molecules and cause changes in the microstructures of the surrounding layers of the part 190.

The powder 120 may be an example embodiment of an additive media used in the additive manufacturing process. The powder 120 may be formed of an atomized metal that fuses with the previously formed layers. A variety of metals may be used in such an additive manufacturing process. For example, the powdered metal may be copper, aluminum, stainless steel, titanium, tungsten, nickel-based super alloys, or the like. The powder 120 may be applied to the surface of the part 190 such that the powder 120 melts and flows into the melt pool 130. According to some example embodiments, the part 190 and the powder 120 may be formed of a material that does not permit x-ray imaging due to scattering, such as, for example, platinum, gold, lead, or the like.

The control circuitry 111 may control the laser generator 110 and the manufacturing process for the part 190. In this regard, the control circuitry 111 may load, for example, each of the 2D layers of the design model of the part 190 and then control the laser generator 110 to construct the part 190, layer-by-layer. In this regard, the control circuitry 111 may control the direction of the laser 112, as well as other characteristics, such as the intensity of the laser 112. According to some example embodiments, the laser 112 may be steerable, the laser generator 110 may be moveable, or a support surface of the part 190 may be moveable under the control of the control circuitry 111 during manufacturing to change the relative position of the part 190 and the laser 112.

According to some example embodiments, the control circuitry 111 may include a processor, which may take the form of a controller. The processor may be operably coupled with a memory to store instructions for execution by the processor. As such, the processor may be software-configured to control, for example, the laser generator 110 to perform a part build or construction process. Alternatively or additionally, the processor may be embodied as a hardware-configured processor in the form of a field programmable logic array (FPGA), an applicant-specific integrated circuit (ASIC), or the like. The processor may include communications capabilities, either directly or via a communications interface component. As such, the processor may configured to communicate via wired or wireless communications to, for example, receive a 3D design model for conversion to 2D layers to perform a build of the part 190.

As mentioned above, during the process of manufacturing the part 190, defects may be introduced into the resulting structure of the part 190. Because the environment and the thermal aspects of the manufacturing process cannot be perfectly controlled and maintained at all times, fluctuations in the temperature of the melt pool 130 may occur that can lead to the formation of defects. For example, if the temperature is too low, a lack of complete fusion can occur resulting in a defect. Alternatively, if the temperature is too high, a keyhole-type defect may be formed. Accordingly, the part 190 in FIG. 1 is shown with defects 140, 142, and 144, which may be lack of fusion defects or keyhole defects. As shown, the defects 140 are single-layer defects. However, the defect 142 may be a multi-layer defect that spans between layer 154 and layer 156.

Additionally, defect 144 may be a single-layer defect in layer 150. However, defect 144 may be disposed close enough to the melt pool 130 that a portion of the conducted heat from the melt pool 130 may be received by the layer 150 and the defect 144. As such, in some instances, sufficient heat may be received at the defect 144 to change the microstructure and "heal" the defect. Therefore, even though construction of layer 150 occurred previously, the structure of layer 150 may still be altered by the conduction of heat. While such healing may occur simply due to the proximity of the defect to the melt pool 130, in some example embodiments, the control circuitry 111 may control the laser generator 110 to cause the conduction of heat in a manner that causes the healing of a known defect.

Figure 2:
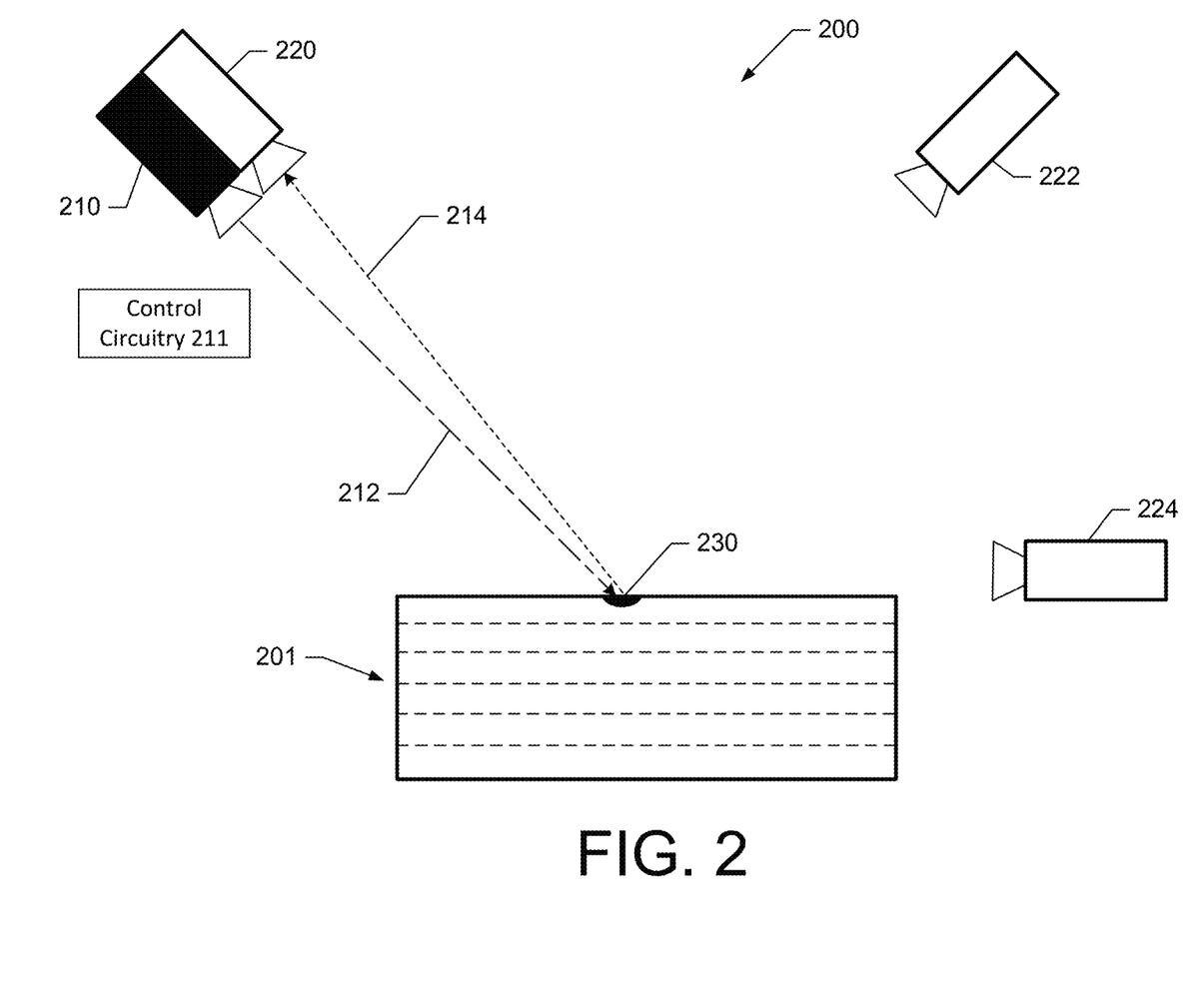
FIG. 2 illustrates an example additive manufacturing and monitoring system configured for in situ defect analysis according to some example embodiments.

Having described aspects of the additive manufacturing process, and the ability to heal previously formed defects, FIG. 2 will now be described that shows a system 200 for additive manufacturing that includes monitoring sensors. In this regard, the system 200 may be similar to the system 100, but may include one or more sensors configured to capture data relating to the manufacturing process. The system 200 may include a laser generator 210 that is similar to the laser generator 110 for constructing a part 201 in a number of layers. However, the laser generator 210 may include or be coupled to a melt pool sensor 220. Further, the laser generator 210 may be controlled by the control circuitry 211, which may be similar the control circuitry 111.

The laser generator 210 may be configured to output a laser 212 to form the melt pool 230 similar to the laser generator 110. However, radiation in the form of, for example, visible light may be reflected by the melt pool 230, as the reflection 214, and may be received by the melt pool sensor 220. The melt pool sensor 220, according to some example embodiments, may be photodiode configured to measure spectral characteristics of the light received at the sensor (e.g., wavelength of the reflected light), an intensity of light received by the sensor within a spectral band, or the like. Although, the reflection 214 appears to be received a different angle from the laser 212, according to some example embodiments, the positioning of the melt pool sensor 220 may be such that the reflection 214 travels the same path as the laser 212. The spectral characteristics or light intensity may be measured and provided to the control circuitry 211 for storage as raw melt data of the melt zone, which includes the area of the melt pool 230. The raw melt data may be coupled with spatial information indicating the position on the part 201 where the raw melt data was captured. Additionally, the spectral characteristics of the light or the intensity of the visible light received by the melt pool sensor 220 may be indicative of the temperature at the surface of the melt pool, which may be determined via a conversion by the control circuitry 211.

According to some example embodiments, the system 200 may include a variety of other sensors that may be employed to capture additional raw melt data for use in analysis. In this regard, additional types of sensors and sensors with differing viewpoints may be included. In this regard, another sensor may be included with the melt pool sensor 202 to have the same viewpoint of the melt zone. The additional sensor may be, for example, an infrared sensor that is configured to capture raw melt data that is descriptive of the infrared light spectral characteristics or intensity being reflected by the melt zone. According to some example embodiments, any sensor configured to capture reflected radiant energy from the melt zone may be employed, where the sensors are tuned to capture data associated with reflected energy within a desired range of the electromagnetic spectrum. In this regard, according to some example embodiments, the sensors, including the melt pool sensor 220, and the sensors 222 and 224, may include photodiodes, photomultiplier tubes, cameras, or the like.

Additionally, sensors with differing viewpoints may additionally, or alternatively, be employed. In this regard, sensor 222 may have an alternate viewpoint for capturing raw melt data about the melt zone at a known angle that is, for example, partially above the part 201. Additionally or alternatively, a sensor 224 may be included that has an alternate viewpoint that is from the side of the part 201. Regardless of the number and type of sensors, the raw melt data collected by the sensors may be provided to the control circuitry 111 and combined into a dataset for the part 201. Additionally, because the raw melt data is spatially correlated, data from different sensors can be combined.

In this regard, according to some example embodiments, the raw melt data may be captured in association with position and timing data. The raw melt data, in the form of spectral data (e.g., wavelength of the reflected light), may therefore be coupled with spatial information in the form of a position indicating where the spectral data was captured. Additionally, a time stamp for the raw melt data may be coupled with the spectral data. The raw melt data may then be converted, for example, into temperature or thermal data or the conversion may wait until processing of the data is necessary. In either case, the raw melt data or the converted data may be stored. According to some example embodiments, the sensors may be configured to capture the raw melt data at a sampling rate based on the ability of the system to process the raw melt data. In some instances, the analysis of the raw melt data may be slow relative to the available sampling rate of the sensors. As such, according to some example embodiments, light intensity data may also be captured and utilized in the same or similar manner as the spectral data. However, with respect to the light intensity data, according to some example embodiments, only a peak light intensity may be captured and stored over a set duration of time.

The structure of the sensor data (either raw melt data or converted raw melt data) may be organized in a number of ways. According to some example embodiments, the raw melt data may captured and handled on a layer-by-layer basis. As such, data for a particular layer may be coupled with a layer identifier or the layer may be determined from the position data associated with the raw melt data. Accordingly, raw melt data for the active layer (layer currently under construction) may be populated into an active layer dataset for that layer. Subsequent layers may therefore have associated layer datasets. Accordingly, the raw melt data for the layers that have been constructed may be stored in a data structure including the active layer dataset (for the layer currently being constructed) and data for the previously constructed layers. Regardless of how the data is structured or organized, the raw melt data including at least the active layer dataset may be provided for data analysis to determine if a defect has occurred.

Figure 3:
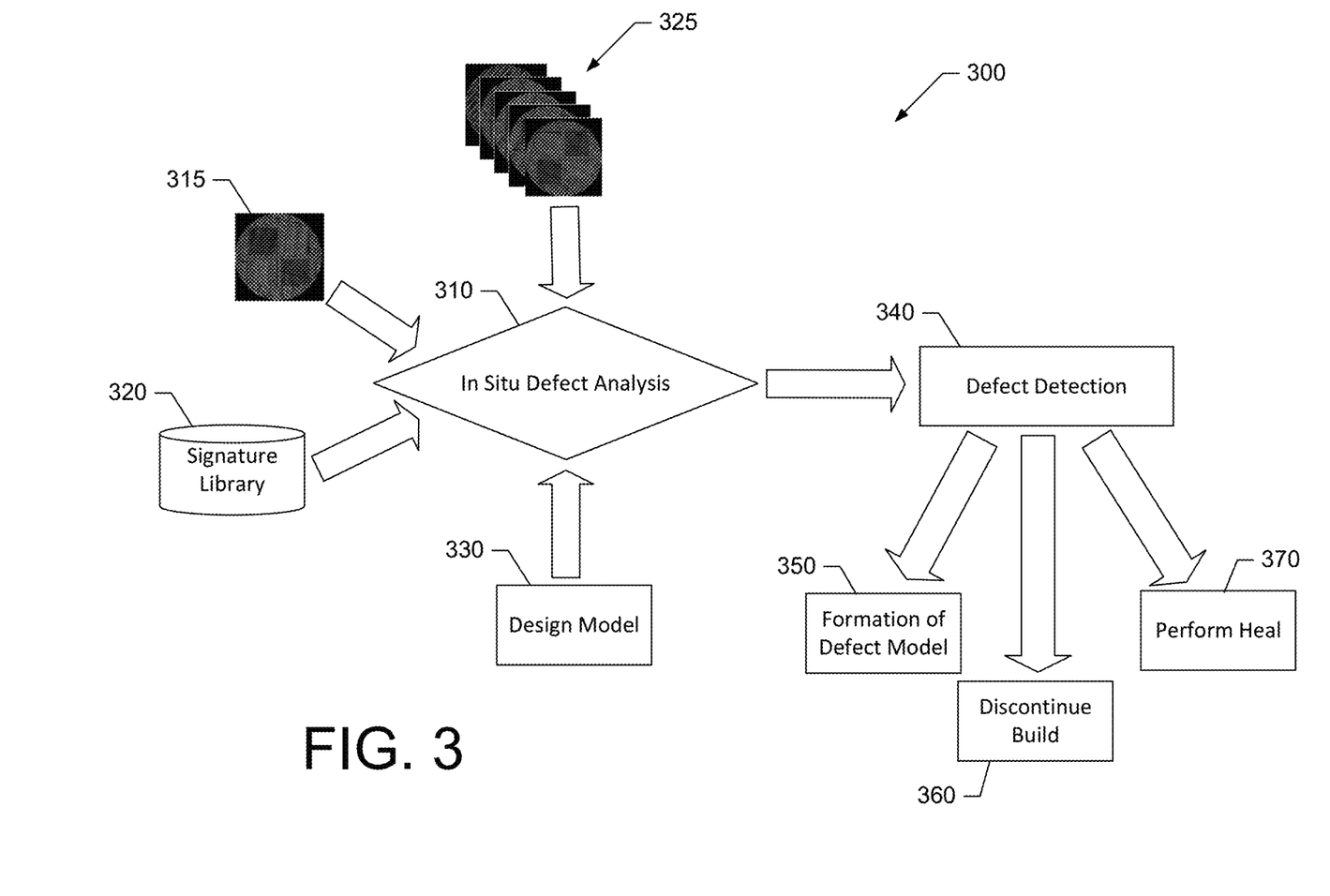
FIG. 3 illustrates a flowchart of a process for in situ defect analysis according to some example embodiments.

FIG. 3 will now be described, which illustrates a process for performing in situ defect analysis for defect detection and defect model formation during part manufacturing. According to some example embodiments, the process 300 may be performed by the control circuitry 211. In this regard, an active layer dataset 315 is shown as an input to the in situ defect analysis 310. The active layer dataset 315 may be a partial or complete dataset for the current layer being constructed. According to some example embodiments, the active layer dataset 315 may be compared to a database of defect signatures stored in the signature library 320. The defect signatures within the signature library 320 may be templates that can be used in comparison to determine if a defect has occurred.

In this regard, for example, with respect to thermal data, it has been determined that the spectral characteristics and intensity of light reflected by the laser 212 incident upon the part 201 during construction can provide indications of when a defect is being formed. Such indications may be substantially nuanced and therefore the use of machine learning is helpful for determining and refining the signatures to form the signature library 320. As described herein, the machine learning may be based on thermal data, but, according to some example embodiments, spectral data from individual spectral channels may also be used in the machine learning. Departing from the in situ defect analysis of FIG. 2 momentarily, the development and refinement of the signature library 320 will first be described with respect to FIG. 4.

Figure 4:
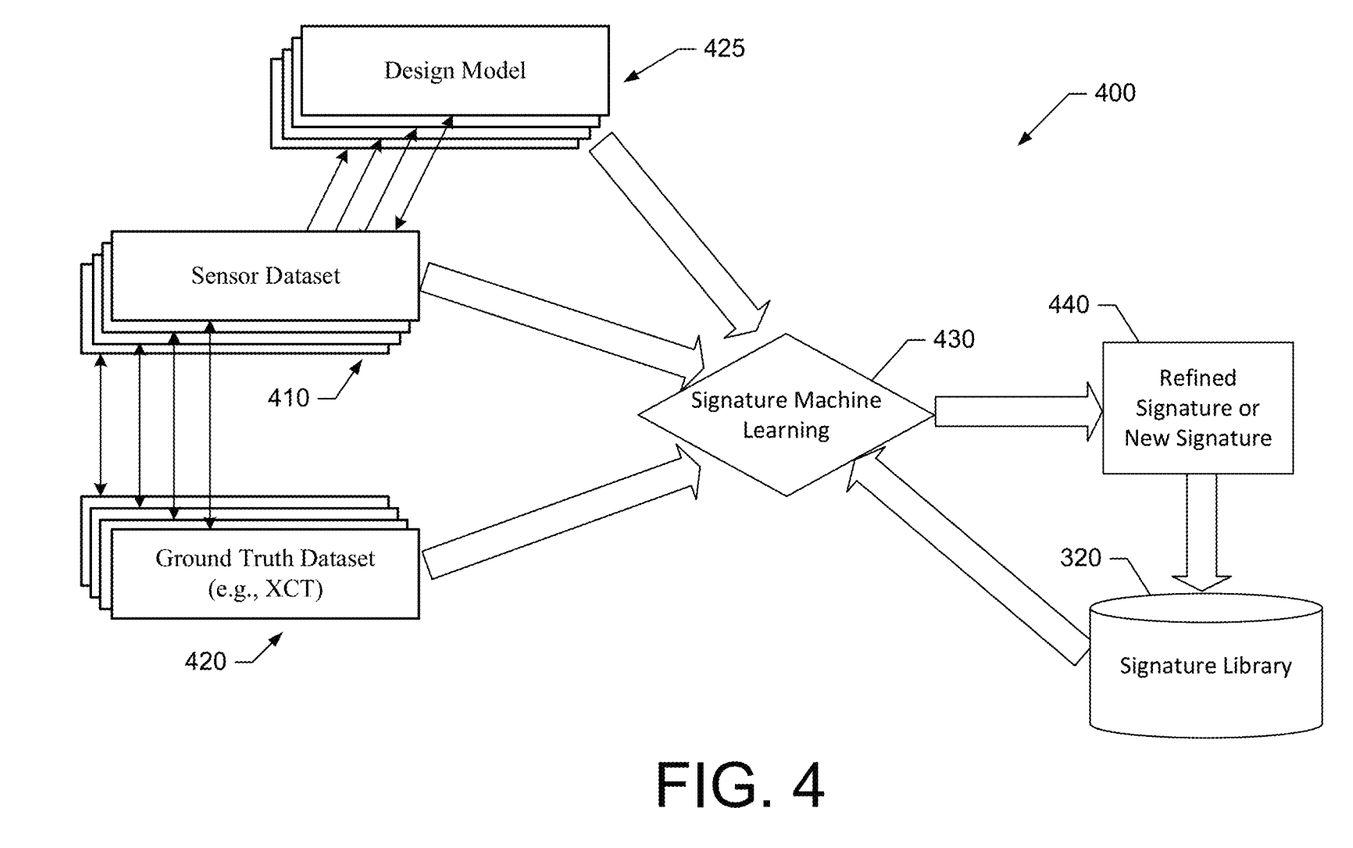
FIG. 4 illustrates a flowchart of a process for generating, via machine learning, a defect signature library according to some example embodiments.

In this regard, referring to FIG. 4, a process 400 for developing and refining the signature library 320 is shown. The process 400 may be a training process for developing the signature library 320. It is understood that the process 400 of FIG. 4 is merely exemplary of a machine learning process that could be used for developing the signature library 320, but is not the only machine learning approach that may be used. Additionally, while the library is referred to as a "signature" library, it is understood that the signatures may be embodied as machine-learned features or collections of machine-learned features. Certainly, different and more complex machine learning techniques may be employed. For example, according to some example embodiments, down-selecting of the raw melt data or additional computations on the raw melt data may be performed, for example, to determine an optimized set of inputs for defect detection. As an input to the process 400, a number of part builds have been previously performed and sensor data (e.g., raw melt data) associated with each build has been stored in a collection of part-build sensor datasets 410. These part-build sensor datasets 410 may include raw melt data or may include versions of the raw melt data that have been processed for machine learning. For purposes of explanation, the sensor data may be spatially defined thermal data, but it is understood that other types of data may be combined with or used in lieu of thermal data. For each part build, a post-processing scan of the resultant part has been performed using, for example, an x-ray computed tomography (XCT) approach to generate a ground truth dataset for each part. As such, a collection of ground truth datasets 420 may be generated. Accordingly, for each part build, a sensor dataset from the collection 410 and an associated ground truth dataset from the collection 420 may be utilized with the arrows between the collections indicating that certain datasets are linked via to a common part build.

The collections 410 and 420 may be provided for signature machine learning at 430 for processing and signature training. The ground truth datasets may be analyzed to determine the existence and locations of defects within a respective part. With the defects identified and located based on the ground truth dataset, the machine learning process at 430 may continue by analyzing the associated sensor dataset. In this regard, a specific defect identified from the ground truth dataset may be used to identify data within the sensor dataset that has any relationship with the defect (e.g., based on position). Accordingly, the beginnings of a signature for the defect in terms of thermal data may be generated at 440 and the new signature may be stored in the signature library 320. Depending on the data that is still available for signature machine learning 430, further refinement or new signature definition may be performed.

If further data for signature machine learning is available, then a process of determining new signatures or refining existing signatures may also be performed at signature machine learning 430. In this regard, a new defect may be selected for analysis that was identified from the ground truth dataset. Again, data within the sensor dataset that has any relationship with the defect (e.g., based on position) may be considered for inclusion in a signature. Signatures from the signature library 320 may be pulled into the signature machine learning at 430 for comparison with the selected sensor data. The selected data from the sensor dataset may first be compared to existing signatures to determine if the selected data is an example instance of an already defined signature or a new signature based on a threshold number of similarity characteristics being found between the sensor data and an existing signature. In other words, if the selected data is sufficiently similar to an existing signature, then the existing signature may be subjected to a refinement process.

In this regard, the selected data may be compared with the data of the existing signature to refine the signature by, for example, reducing non-defect indicating variables from the signature based on the selected data from the sensor dataset. In this manner, the signatures of the signature library 320 may be continually refined and simplified via machine learning and consideration of new data to improve accuracy for identifying defects when employed in an in situ analysis and to improve the speed of identifying defects when employed in an in situ analysis.

Alternatively, if a threshold number of similarity characteristics is not found (i.e., the selected data is not sufficiently similar to an existing signature), then a new signature may be defined based on the selected data at 440 and the new signature may be stored in the signature library 320. According to some example embodiments, divergence of the signature dataset should occur within the signature library 320 thereby creating discrete signatures for identifying defects. However, in some instances, it can occur that parallel signatures may develop that are related, but were initially derived on a different basis. As such, according to some example embodiments, a comparison of the signatures themselves may be performed to determine if parallel signatures have been formed (e.g., identified by having a threshold number of similar characteristics) and an analysis of the similar signatures may be undertaken to determine if the two parallel signatures may be simplified into a single signature. Additionally, according to some example embodiments, in the event that ground truth datasets are formed, for whatever reason, those datasets may be used with associated sensor data to continually improve the signature library 320.

As described above, the signatures of the signature library 320 may be determined based on sensor data of a single layer of a build or sensor data from multiple layers of a part build. In this regard, the sensor data that is selected for analysis with respect to a defect may be selected from a number of layers of the part that is associated with the sensor data. As such, the determination of a signature may be based on the final layer that was affected by the defect and prior layers. In other words, the determination of a defect need not be a singular layer analysis and may involve the analysis of sensor data from a number of layers.

Additionally, a defect signature may also be based on the architecture of the part. In this regard, the temperature responses may be different depending on the architecture of the feature being constructed at that time. In other words, different features may have different radiation responses and therefore a signature may account for the effects of the part's architecture. As such, in addition to the sensor data collection 410 and the ground truth dataset 420, the associated design model of the part being constructed may be factored into the signature machine learning 430. Accordingly, a collection of design models 425 may also be used as an input, where each of the design models corresponds to a part that has a counterpart sensor dataset and ground truth dataset (as indicated by the arrows with the sensor dataset). In this regard, the sensor dataset, the ground truth dataset, and the design model may be correlated based on a common spatial coordinate system so that data relevant to a defect can be extracted and refined into a defect signature for use in detecting similar defect signatures. Accordingly, the signature library 320 may be generated for use in manufacture-time assessment of system operation to detect defects in a part being manufactured.

Having described the development of the signature library 320 using a signature machine learning approach, the description will now turn back to FIG. 3 and the application of the signature library 320 in the context of in situ defect analysis and defect detection. As previously described, the active layer dataset 315 may be compared to signatures within the signature library 320 as an operation of the in situ defect analysis 310 to perform defect detection at 340. Such comparisons may be performed at high processing speeds and therefore resolution of a defect may be performed while the part is being constructed. According to some example embodiments, a variety of comparison techniques may be employed. For example, a nearest neighbor search technique or other similarity assessment may be performed as part of the in situ defect analysis 310. Further, according to some example embodiments, machine-learning algorithms may be employed as part of the in situ defect analysis 310. For example, when using machine-learning algorithms, the in situ defect analysis 310 may involve the signature library 320, formed as a machine learning model, having the comparison operations embedded in the signature library such that the inputs to the in situ defect analysis 310 can be applied to the signature library 320 and the library may be configured to output defect detections.

Further, with respect to the comparisons that are performed for defect detection, according to some example embodiments, a similarity threshold may be applied to the comparison between the active layer dataset 315 and the defect signatures within the signature library 320 to determine if the active layer dataset 315 includes sufficient similarities to determine that a match with a defect signature within the signature library 320 has been identified. If a match is found, a defect may be detected at defect detection 340 while the manufacturing process is being conducted.

According to some example embodiments, the active layer dataset 315 may be one example input that is considered in the in situ defect analysis 310 to detect a defect at 340. However, according to some example embodiments, a number of other factors may be considered and coupled with the active layer dataset 315 for comparison with the defect signatures of the signature library 320 to identify a defect. In this regard, for example, prior layer datasets 325 associated with the manufacturing of prior, lower layers of the part may be included as an input to the in situ defect analysis 310. As mentioned above, the defect signatures may be based on data associated with multiple layers of a build, and therefore the prior layer datasets 325, with the active layer dataset 315, may be compared to the signature library 320 to identify a defect signature that may match the combined layer data to indicate that a defect has been identified.

Additionally, according to some example embodiments, the design model 330 of the part under construction may also be an input into the in situ defect analysis 310. In this regard, the design model 330 may be a 3D digital model of the part or a collection of 2D layers that make up the 3D digital model. Use of the design model 330 may provide a predictive feature to the in situ defect analysis 310. In this regard, because the design model 330 may include information about the building of future layers of the part, certain characteristics of active layer dataset 315 may be analyzed in view of the future layers. In this manner, a current characteristic, such as a thermal characteristic of the active layer dataset, in combination with the design model 330, may reveal the existence of a defect or the ongoing development of a defect when a comparison with the signature library 320 is performed. As mentioned above, the defect signatures may also be developed based on design models. Therefore, the defect signatures may include information based on sensor data and the construction of a completed part that may have the same or similar architectures and features as the part currently be constructed and analyzed for defects. Accordingly, the inclusion of the design model 330 in the in situ defect analysis 310 may also facilitate the detection of defects in the part being manufactured. Additionally, regardless of the variety of inputs that may be utilized to facilitate in situ defect analysis 310, similarity thresholds with the defect signatures may be employed to determine that a defect has been identified. As such, a perfect match with a signature need not be necessary and therefore the high likelihood of a match with a defect signature may be sufficient to result in a defect detection at 340. According to some example embodiments, the similarity thresholds may be selected and controlled based on a desired degree of tolerance of a given part. As such, for example, the thresholds may be selected based on the requirements for certification of a part, if necessary.

Additionally, upon detection of a defect at 340, the process 300 may continue by formation of a defect model at 350. In this regard, the detection of a defect at 340 may result in the data associated with the defect being logged for use in generating or forming a defect model as a tomographic model of the part. Accordingly, a defect structure and morphology may be generated. Based on the raw melt data and possibly the signature used to detect the defect, a data representation of the defect may be determined and stored as a feature of a defect model. Each defect that is detected in the part may be added to the model and, as a result, a complete defect model of the part may be generated upon completion of the manufacturing of the part. The result may be, for example, an in situ thermally computed tomography of the part and may be embodied in a similar manner as an x-ray computed tomography of the part. As such, post-production analyses that would typically be performed on an x-ray computed tomography may be performed on the in situ generated tomography. More specifically, the defect model may be provided for part certification upon completion or immediately upon completion of manufacturing the part.

According to some example embodiments, upon detection of a defect at 340, an assessment of the defect may be performed to determine if the construction or building of the part should be discontinued at 350. In this regard, if a substantial defect is identified or a defect positioned at a location that can lead to a part failure, the build may be discontinued at 360. Upon discontinuing the build, a determination may be made to determine whether the defect is one that would require the part to be scrapped. Alternatively, at 370, a healing process may be performed to remedy the defect. In this regard, the control circuitry 211 may control the laser to perform a scanning pass of the active layer of the part. Such a scanning pass may generate further raw melt data for analysis or the scanning pass may perform a healing of defects in the active layers or layers below the active layer. Alternatively, the laser may be controlled to melt material at a directed location on the active layer to cause heat to be conducted to a desired layer to resolve a defect.

Figure 5:
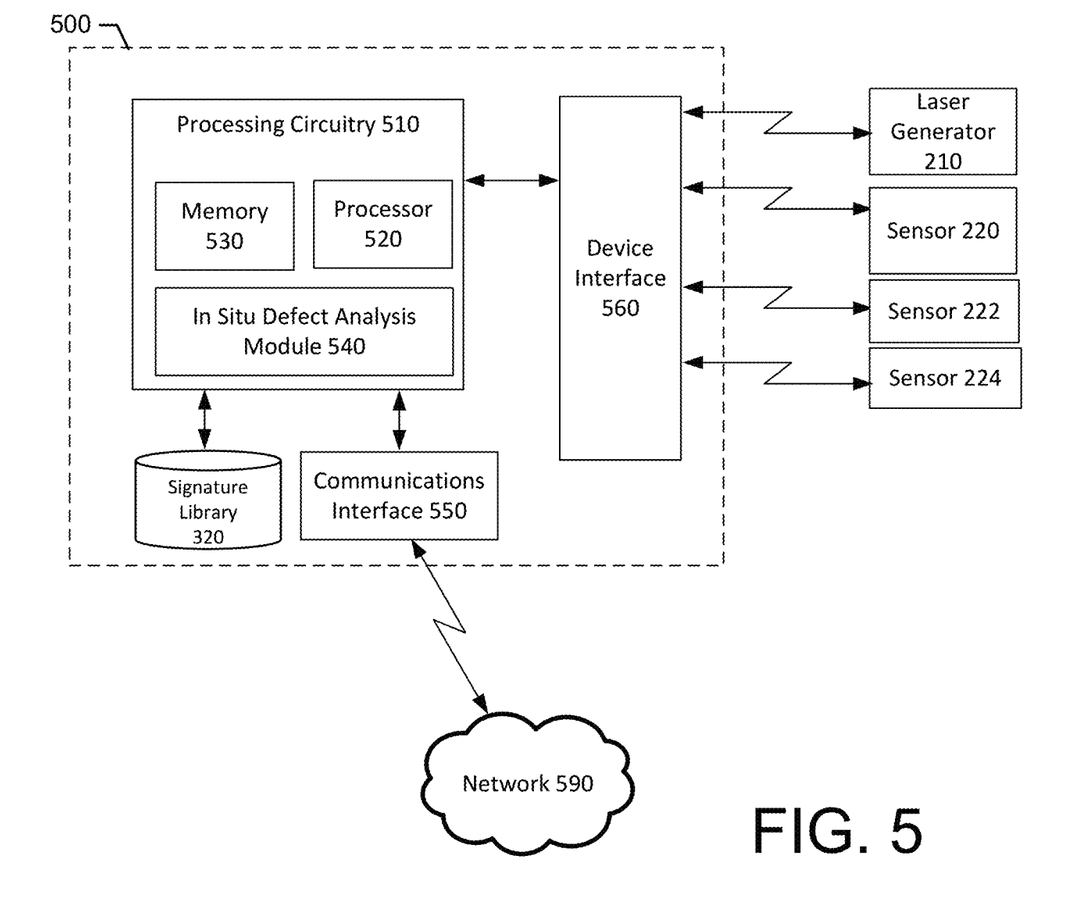
FIG. 5 illustrates an example additive manufacturing and monitoring apparatus configured for in situ defect analysis according to some example embodiments.

Now referring to FIG. 5, according to some example embodiments, an example apparatus 500 is provided that may monitor and analyze an additive manufacturing process. In this regard, the apparatus 500 may include circuitry that may be centralized in a single device or distributed across a number of devices. As such, according to some example embodiments, the functionalities described with respect to the apparatus 500 may be performed by a centralized device or some functionalities may be performed by circuitry of another device. As such, the configuration of the apparatus 500 to perform the functionalities described herein may be performed by a number of distributed devices with circuitry to support to performance of the functionalities.

Therefore, according to some example embodiments, the apparatus 500 may include processing circuitry 510. Processing circuitry 510 may, in turn, include a processor 520, a memory 530, the in situ defect analysis module 540, and a communications interface 550. Additionally, the apparatus 500 may include additional components not shown in FIG. 5 and the processing circuitry 510 may be operably coupled to other components of the apparatus 500 that are not shown in FIG. 5.

Further, according to some example embodiments, processing circuitry 510 may be in operative communication with or embody, the memory 530, the processor 520, in situ defect analysis module 540, and the communications interface 550. Through configuration and operation of the memory 530, the processor 520, the in situ defect analysis module 540, and the communications interface 550, the processing circuitry 510 may be configurable to perform various operations as described herein, including the operations and functionalities described with respect to the processes 300 and 400, as well as the control circuitry 111 and 211 described above. In this regard, the processing circuitry 510 may be configured to perform computational processing, memory management, and, additive manufacturing control and monitoring, according to various example embodiments. In some embodiments, the processing circuitry 510 may be embodied as a chip or chip set. In other words, the processing circuitry 510 may include one or more physical packages (e.g., chips) including materials, components or wires on a structural assembly (e.g., a baseboard). The processing circuitry 510 may be configured to receive inputs (e.g., via peripheral components), perform actions based on the inputs, and generate outputs (e.g., for provision to peripheral components). In an example embodiment, the processing circuitry 510 may include one or more instances of the processor 520, associated circuitry, and the memory 530. As such, the processing circuitry 510 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 530 may include one or more non-transitory memory devices such as, for example, volatile or non-volatile memory that may be either fixed or removable. The memory 530 may be configured to store information, data, applications, instructions or the like for enabling, for example, the functionalities described with respect to the in situ defect analysis module 540. The memory 530 may operate to buffer instructions and data during operation of the processing circuitry 510 to support higher-level functionalities, and may also be configured to store instructions for execution by the processing circuitry 510. The memory 530 may also store various information including the signature library 320. According to some example embodiments, the signature library 320 may be stored at remote location and accessed by the processing circuitry 510 via the communications interface 550. According to some example embodiments, various data stored in the memory 530 may be generated based on other received data (e.g., raw melt data from the sensors 220, 222, or 224) and stored or the data may be retrieved via the communications interface 550 and stored in the memory 530.

As mentioned above, the processing circuitry 510 may be embodied in a number of different ways. For example, the processing circuitry 510 may be embodied as various processing means such as one or more processors 205 that may be in the form of a microprocessor, graphics processing unit, or other processing element, a coprocessor, a controller, or various other computing or processing devices including integrated circuits such as, for example, an ASIC (application specific integrated circuit), an FPGA, or the like. In an example embodiment, the processing circuitry 510 may be configured to execute instructions stored in the memory 530 or otherwise accessible to the processing circuitry 510. As such, whether configured by hardware or by a combination of hardware and software, the processing circuitry 510 may represent an entity (e.g., physically embodied in circuitry—in the form of processing circuitry 510) capable of performing operations according to example embodiments while configured accordingly. Thus, for example, when the processing circuitry 510 is embodied as an ASIC, FPGA, or the like, the processing circuitry 510 may be specifically configured hardware for conducting the operations described herein. Alternatively, as another example, when the processing circuitry 510 is embodied as an executor of software instructions, the instructions may specifically configure the processing circuitry 510 to perform the operations described herein.

The communications interface 550 may include one or more interface mechanisms for enabling communication with other devices external to the apparatus 500, via, for example, network 590, which may, for example, be a local area network, the Internet, or the like, through a direct (wired or wireless) communication link to another external device, or the like. In some cases, the communications interface 550 may be any means such as a device or circuitry embodied in either hardware, or a combination of hardware and software that is configured to receive or transmit data from/to devices in communication with the processing circuitry 510. The communications interface 550 may be a wired or wireless interface and may support various communications protocols (WIFI®, BLUETOOTH®, cellular, or the like).

The device interface 560 may be input/output interface that operates between the processing circuitry 510 and peripheral devices that are controlled by and/or provide data to the processing circuitry 510. According to some example embodiments, the device interface 560 may be integrated into the processing circuitry 510 or the device interface 560 may be housed in a separate component configured to translate or otherwise interface with the peripheral devices in a manner that the processing circuitry 510 may not be able to directly. However, according to some example embodiments, the processing circuitry 510 may be configured to directly interface with peripheral devices.

In this regard, via the device interface 560, the processing circuitry 510 may be configured to interface with the laser generator 210 (or other energy source generator) and the sensors 220, 222, and 224. In this regard, processing circuitry 510 may be configured to interface with the laser generator 210 to control operation of the laser generator 210 in the process of performing additive manufacturing as described herein. More specifically, the processing circuitry 510 may be configured to control the direction and intensity of the laser generated by the laser generator 210 (or other energy beam generated by an energy source generator). Further, the laser generated by the laser generator 210 may be scanning laser, and therefore the processing circuitry 510 may be configured to control the scanning operations of the laser for fusing additive media to perform a manufacturing operation or for performing a healing operation to remedy the occurrence of a detected defect in a part that is being manufactured.

As mentioned above, the sensors 220, 222, and 224 may be any type of imaging sensor. According to some example embodiments, the sensors 220, 222, and 224 may be photodiodes configured to measure spectral characteristics and light intensity and provide the spectral data or light intensity data in the form of raw melt data to the processing circuitry 510 for processing. However, the sensors 220, 222, and 224 may be embodied in a number of forms. For example, according to some example embodiments, one or more of the sensors 220, 222, and 224 may be a camera. The camera may be a visible light detection device (e.g., an optical imaging sensor) or, for example, an infrared detection device or sensor. In this regard, as a camera, the sensors 220, 222, and 224 may be configured to capture images of the melt zone on a part currently under construction in an additive manufacturing process. In this regard, a camera may be a digital imaging device configured to receive light to capture an image and convert the light into data representative of the light captured by the camera as a component of image data as described herein. According to some example embodiments, the spectral attributes of the light may be converted into a temperature to obtain thermal data from a camera. According to some example embodiments, the sensors 220, 222, and 224 as cameras may be controlled by the processing circuitry 510 to capture images as requested by the processing circuitry 510. In this regard, the processing circuitry 510 may be configured to cause repeating images to be captured such that the images may be combined to indicate changes with respect to time. In example embodiments wherein the camera is stationary, the autonomous vehicle 20 may move into different positions to capture a desired image. According to some example embodiments, an angle of the perspective of the camera may be stored (e.g., in the memory 530) in association with a captured image so that the perspective angle may be considered during data analysis.

Regardless of the form of the sensors 220, 222, and 224, the processing circuitry 510 may be configured to control the operation of the sensors 220, 222, and 224. In this regard, the processing circuitry 510 may control the sensors 220, 222, and 224 to capture raw melt data for analysis by the processing circuitry 510, and more specifically the in situ defect analysis module 540.

The in situ defect analysis module 540 may, according to some example embodiments, be circuitry that is part of or a configuration of the processor 520, possibly in combination with the memory 530. As such, the in situ defect analysis module 540 may be configured to cause the processing circuitry 510 to perform various functionalities as a component of the processing circuitry 510. As such, the in situ defect analysis module 540, and thus the processing circuitry 510, may be configured to control the laser generator 210 to cause a laser to heat a melt zone of the a part under construction to fuse an additive media (e.g., a metal powder) with an active layer of the part to build the part based on a part design model. In this regard, the part design model may have been provided to the processing circuitry 510 via the communications interface 550. The processing circuitry 510 may be configured to process the part design model, which may be a 3D digital model of the part, to prepare the part design model for use in manufacturing. According to some example embodiments, the part design model may be decomposed into a plurality of 2D layers that may be used for the layered manufacturing approach of some additive manufacturing techniques. The processing circuitry 510 may also be configured to control the sensors 220, 222, and 224 to capture raw melt data of the melt zone.

The in situ defect analysis module 540, as component of the processing circuitry 510, may be configured to generate, based on the raw melt data, an active layer dataset that is spatially defined, and analyze the active layer dataset with respect to a plurality of defect signatures within a defect signature library. In this regard, the defect signature library may have been predefined based on a machine learning processing of historical sensor datasets with corresponding ground truth datasets. Additionally, the in situ defect analysis module 540 may be configured to detect a defect in the part based on the analysis of the active layer dataset with respect to a plurality of defect signatures. This detection of a defect may be performed simultaneously with the laser acting upon the active layer of the part for manufacturing of the part.

According to some example embodiments, the in situ defect analysis module 540 may be further configured to develop a defect model of the part based on the detection of the defect in combination with other defect detections identified in the part. Additionally, according to some example embodiments, the in situ defect analysis module 540 may be configured to provide, for example via the communications interface 550, the defect model for part certification upon completion of manufacturing of the part. Additionally, according to some example embodiments, the in situ defect analysis module 540 may be configured to develop a defect model of the part based on the active layer dataset and additional layer datasets corresponding to additional layers involved in manufacturing the part.

According to some example embodiments, the in situ defect analysis module 540 may be configured to discontinue construction of the part in response to detecting the defect. Further, according to some example embodiments, the in situ defect analysis module 540 may be configured to control the laser, via the laser generator 210, to perform a healing operation to remove the defect based on the analysis of the active layer dataset. The in situ defect analysis module 540 may also be configured to resume construction of the part in accordance with the part design model.

According to some example embodiments, the in situ defect analysis module 540 may also be configured to generate the active layer dataset to include temperature data that is spatially defined based on the spectral data or light intensity data provided by the sensors 220, 222, and 224. Additionally, according to some example embodiments, the in situ defect analysis module 540 may be configured to analyze the active layer dataset and previously constructed layer datasets for the part with respect to the plurality of defect signatures. In this regard, the in situ defect analysis module 540 may be further configured to detect the defect based on the analysis of the active layer dataset and previously constructed layer datasets with respect to the plurality of defect signatures.

As mentioned above, according to some example embodiments, the part design model may define a plurality of model layers including an active model layer that corresponds to the active layer and future model layers corresponding to future layers to be built in the construction of the part. In view of this, the in situ defect analysis module 540 may be configured to analyzing the active layer dataset and the future model layers with respect to the plurality of defect signatures, and detect the defect based on the analysis of the active layer dataset and the future model layers with respect to the plurality of defect signatures. Additionally, according to some example embodiments, the processing circuitry 510 may be configured to control a single sensor 220 or a plurality of sensors 220, 222, and 224 to capture raw melt data of the melt zone.

Figure 6:
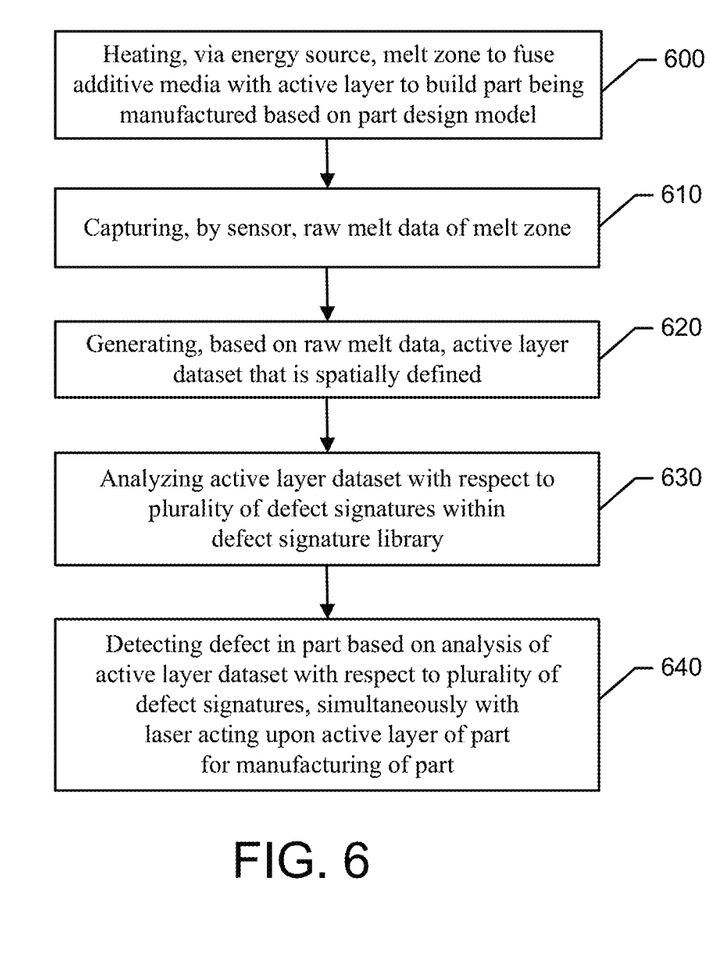
FIG. 6 illustrates flowchart of an example manufacturing and monitoring method for in situ defect analysis according to some example embodiments.

Now referring to FIG. 6, an example method for monitoring and analyzing an additive manufacturing process is provided. According to some example embodiments, the example method may include, at 600, heating, via a laser, a melt zone to fuse an additive media with an active layer to build a part being manufactured based on a part design model. Additionally, at 610, the example method may further include capturing, by a sensor, raw melt data of the melt zone. At 620, the example method may further include generating, based on the raw melt data, an active layer dataset that is spatially defined. Additionally, the example method may include, at 630, analyzing the active layer dataset with respect to a plurality of defect signatures within a defect signature library. In this regard, the defect signature library may be predefined based on a machine learning processing of historical sensor datasets with corresponding ground truth datasets. Further, the example method may include detecting a defect in the part based on the analysis of the active layer dataset with respect to a plurality of defect signatures, simultaneously with the laser acting upon the active layer of the part for manufacturing of the part.

Additionally, according to some example embodiments, the example method may further include developing a defect model of the part based on the detection of the defect in combination with other defect detections identified in the part. Additionally or alternatively, the example method may further include, according to some example embodiments, providing the defect model for part certification upon completion of manufacturing of the part. According to some example embodiments, the example method may, additionally or alternatively, further include developing a defect model of the part based on the active layer dataset and additional layer datasets corresponding to additional layers involved in manufacturing the part. According to some example embodiments, the example method may further include, additionally or alternatively, discontinuing construction of the part in response to detecting the defect. Additionally or alternatively, according to some example embodiments, the example method may further include controlling the laser to perform a healing operation to remove the defect based on the analysis of the active layer dataset. Additionally, the example method may include construction of the part in accordance with the part design model after removing the defect. According to some example embodiments, the sensor may be a photodiode and the raw melt data may include spectral data or light intensity data. Additionally or alternatively, according to some example embodiments, generating the active layer dataset may include generating the active layer dataset to include temperature data that is spatially defined based on the spectral data or light intensity data. Additionally or alternatively, according to some example embodiments, analyzing the active layer dataset may include analyzing the active layer dataset and previously constructed layer datasets for the part with respect to the plurality of defect signatures. Additionally or alternatively, detecting the defect may include detecting the defect based on the analysis of the active layer dataset and previously constructed layer datasets with respect to the plurality of defect signatures. According to some example embodiments, additionally or alternatively, the part design model may define a plurality of model layers including an active model layer that corresponds to the active layer and future model layers corresponding to future layers to be built in the construction of the part. Additionally, analyzing the active layer dataset may include analyzing the active layer dataset and the future model layers with respect to the plurality of defect signatures. Detecting the defect may additionally include detecting the defect based on the analysis of the active layer dataset and the future model layers with respect to the plurality of defect signatures. Additionally or alternatively, according to some example embodiments, the part may be made of a material that is not penetrated by x-rays and does not permit x-ray imaging of an internal area of the part. Additionally or alternatively, according to some example embodiments, capturing raw melt data of the melt zone may include capturing raw melt data from a plurality of sensors, and the plurality of sensors may include an optical imaging sensor or an infrared imaging sensor.

With respect to some additional example embodiments, a system is provided. According to some example embodiments, the system may be for monitoring and analyzing an additive manufacturing process. The example system may include a laser energy source configured to heat a melt zone to fuse an additive media with an active layer to build a part being manufactured based on a part design model, a sensor configured to capture raw melt data of the melt zone, and processing circuitry. The processing circuitry may be configured to generate, based on the raw melt data, an active layer dataset that is spatially defined. The processing circuitry may analyze the active layer dataset with respect to a plurality of defect signatures within a defect signature library. The defect signature library may be predefined based on a machine learning processing of historical sensor datasets with corresponding ground truth datasets. Additionally, the processing circuitry may be configured to detect a defect in the part based on the analysis of the active layer dataset with respect to a plurality of defect signatures, simultaneously with the laser energy source acting upon the active layer of the part for manufacturing of the part.

According to some example embodiments, an apparatus for monitoring and analyzing an additive manufacturing process is provided. The apparatus may include processing circuitry configured to generate, based on raw melt data provided by a sensor, an active layer dataset that is spatially defined, and analyze the active layer dataset with respect to a plurality of defect signatures within a defect signature library. The defect signature library may be predefined based on a machine learning processing of historical sensor datasets with corresponding ground truth datasets. The processing circuitry may also be configured to detect a defect in a part being manufactured based on the analysis of the active layer dataset with respect to a plurality of defect signatures, simultaneously with a laser energy source acting upon an active layer of the part for manufacturing the part.

As used herein, the term "module" is intended to include a computer-related entity, such as but not limited to hardware, software, or a combination of hardware and software. For example, a module may be, but is not limited to being a software or hardware implementation of a process, an object, an executable, and/or a thread of execution, which may be implemented via a processor or computer. By way of example, both an application running on a computing device and/or the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although such examples are described in terms of separate modules corresponding to various functions performed, some examples need not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular entity that is specifically configured in, or can be operably coupled to, processing circuitry to modify the behavior and/or capability of the processing circuitry based on the hardware and/or software that is added to or otherwise operably coupled to the processing circuitry to configure the processing circuitry accordingly.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

What is claimed is:

1. A method for monitoring and analyzing an additive manufacturing process, the method comprising:
heating, via an energy source, a melt zone to form a melt pool to fuse an additive media on an active layer to build a part being manufactured based on a part design model;
receiving, by a sensor, reflected radiation from the melt pool due to the energy source acting upon the melt pool and generating raw melt data of the melt pool based on the reflected radiation;
generating, based on the raw melt data, an active layer dataset that is spatially defined;

analyzing the active layer dataset with respect to a plurality of defect signatures within a defect signature library to identify matches between the active layer dataset and the plurality of defect signatures, the defect signatures within the defect signature library indicating characteristics of a melt pool that are indicative of the formation of a defect due to conditions including temperatures below a target temperature for the melt pool and temperatures above the target temperature for the melt pool, the defect signature library being predefined based on a machine learning processing of historical sensor datasets with corresponding ground truth datasets; and detecting a defect in the part based on the analyzing the active layer dataset with respect to a plurality of defect signatures.

2. The method of claim 1, further comprising developing a defect model of the part based on the detecting the defect in combination with other defect detections identified in the part.

3. The method of claim 2, further comprising providing the defect model for part certification upon completion of manufacturing of the part.

4. The method of claim 1, further comprising developing a defect model of the part based on the active layer dataset and additional layer datasets corresponding to additional layers involved in manufacturing the part.

5. The method of claim 1, further comprising, in response to detecting the defect, discontinuing construction of the part.

6. The method of claim 5, further comprising:
controlling a laser to perform a healing operation to remove the defect based on the analyzing the active layer dataset; and
resuming construction of the part in accordance with the part design model.

7. The method of claim 1, wherein
the raw melt data comprises light intensity data indicative of an intensity of the reflected radiation received by the sensor, and
the generating the active layer dataset includes generating the active layer dataset to include temperature data that is spatially defined based on the light intensity data.

8. The method of claim 1, wherein
the analyzing the active layer dataset comprises analyzing the active layer dataset and previously constructed layer datasets for the part with respect to the plurality of defect signatures, and
the detecting the defect comprises detecting the defect based on the analyzing the active layer dataset and previously constructed layer datasets with respect to the plurality of defect signatures.

9. The method of claim 1 wherein
the part design model defines a plurality of model layers including an active model layer that corresponds to the active layer and future model layers corresponding to future layers to be built in construction of the part,
the analyzing the active layer dataset comprises analyzing the active layer dataset and the future model layers with respect to the plurality of defect signatures, and
the detecting the defect comprises detecting the defect based on the analyzing the active layer dataset and the future model layers with respect to the plurality of defect signatures.

10. The method of claim 1, wherein the part is made of a material that is not penetrated by x-rays and does not permit x-ray imaging of an internal area of the part.

11. The method of claim 1, wherein
the generating the raw melt data of the melt pool comprises receiving reflected radiation from the melt pool due to the energy source acting upon the melt pool by a plurality of sensors comprising the sensor and generating the raw melt data based on the reflected radiation received at each sensor in the plurality of sensors, and
the plurality of sensors comprise an optical imaging sensor or an infrared imaging sensor.

12. A system for monitoring and analyzing an additive manufacturing process, the system comprising:
an energy source configured to heat a melt zone to form a melt pool to fuse an additive media on an active layer to build a part being manufactured based on a part design model;
a sensor configured to receive reflected radiation from the melt pool due to the energy source acting upon the melt pool and generating raw melt data of the melt pool based on the reflected radiation; and
processing circuitry configured to:
generate, based on the raw melt data, an active layer dataset that is spatially defined;
analyze the active layer dataset with respect to a plurality of defect signatures within a defect signature library to identify matches between the active layer dataset and the plurality of defect signatures, the defect signatures within the defect signature library indicating characteristics of a melt pool that are indicative of the formation of a defect due to conditions including temperatures below a target temperature for the melt pool and temperatures above the target temperature for the melt pool, the defect signature library being predefined based on a machine learning processing of historical sensor datasets with corresponding ground truth datasets; and
detect a defect in the part based on the analyzing the active layer dataset with respect to a plurality of defect signatures.

13. The system of claim 12, wherein the processing circuitry is further configured to develop a defect model of the part based on a detected defect in combination with other defected detections within the part.

14. The system of claim 13, wherein the processing circuitry is further configured to provide the defect model for part certification upon completion of manufacturing of the part.

15. The system of claim 12, wherein the processing circuitry is further configured to discontinue construction of the part in response to detecting the defect.

16. The system of claim 15, wherein the processing circuitry is further configured to:
control the energy source to perform a healing operation to remove the defect based on the analyzing the active layer dataset; and
resume construction of the part in accordance with the part design model.

17. The system of claim 12, wherein
the raw melt data comprises spectral data or light intensity data indicative of a wavelength or intensity, respectively, of the reflected radiation received by the sensor, and
the processing circuitry is further configured to generate the active layer dataset to include temperature data that is spatially defined based on the spectral data or light intensity data.

18. An apparatus for monitoring and analyzing an additive manufacturing process, the apparatus comprising processing circuitry configured to:
generate, based on raw melt data provided by a sensor, an active layer dataset that is spatially defined, wherein the raw melt data is based on reflected radiation from the melt pool, received by the sensor, due to an energy source acting upon the melt pool to manufacture a part;
analyze the active layer dataset with respect to a plurality of defect signatures within a defect signature library to identify matches between the active layer dataset and the plurality of defect signatures, the defect signatures within the defect signature library indicating characteristics of a melt pool that are indicative of the formation of a defect due to conditions including temperatures below a target temperature for the melt pool and temperatures above the target temperature for the melt pool, the defect signature library being predefined based on a machine learning processing of historical sensor datasets with corresponding ground truth datasets; and
detect a defect in a part being manufactured based on the analyzing the active layer dataset with respect to a plurality of defect signatures.

19. The apparatus of claim 18, wherein the processing circuitry is further configured to discontinue construction of the part in response to detecting the defect.

20. The apparatus of claim 19, wherein the processing circuitry is further configured to:
control the energy source to perform a healing operation to remove the defect based on the analyzing the active layer dataset; and
resume construction of the part in accordance with a part design model.

* * * * *